(12) United States Patent
Kim et al.

(10) Patent No.: US 9,191,785 B2
(45) Date of Patent: Nov. 17, 2015

(54) GROUP COMMUNICATION METHOD AND APPARATUS

(75) Inventors: Sung Kyung Kim, Daejeon (KR); Sung Cheol Chang, Daejeon (KR); Eunkyung Kim, Daejeon (KR); Hyun Lee, Daejeon (KR); Chul Sik Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 383 days.

(21) Appl. No.: 13/814,252

(22) PCT Filed: Sep. 30, 2011

(86) PCT No.: PCT/KR2011/007230
§ 371 (c)(1),
(2), (4) Date: Feb. 5, 2013

(87) PCT Pub. No.: WO2012/044109
PCT Pub. Date: Apr. 5, 2012

(65) Prior Publication Data
US 2013/0130736 A1 May 23, 2013

(30) Foreign Application Priority Data

Sep. 30, 2010 (KR) .......... 10-2010-0095478
Sep. 29, 2011 (KR) .......... 10-2011-0099397

(51) Int. Cl.
*H04W 4/08* (2009.01)
*H04W 52/02* (2009.01)
*H04W 4/10* (2009.01)

(52) U.S. Cl.
CPC ........ *H04W 4/08* (2013.01); *H04W 4/10* (2013.01); *H04W 52/0216* (2013.01); *H04W 52/0219* (2013.01)

(58) Field of Classification Search
CPC ............. H04W 52/0219; H04W 52/0216
USPC .......... 455/517, 518, 519, 520, 416, 509, 455/452.1; 370/311
See application file for complete search history.

(56) References Cited

U.S. PATENT DOCUMENTS

| | | | | |
|---|---|---|---|---|
| 5,797,100 | A * | 8/1998 | Dettner | 455/518 |
| 2009/0170488 | A1 * | 7/2009 | Becker et al. | 455/416 |
| 2013/0184027 | A1 * | 7/2013 | Becker et al. | 455/519 |

OTHER PUBLICATIONS

IEEE P802.16m/D6 May 2010, "Draft Amendment to IEEE Standard for Local and metropolitan area networks. Part 16: Air Interface for Fixed and Mobile Broadband Wireless Access Systems", IEEE Computer Society, May 22, 2010.

(Continued)

*Primary Examiner* — John J Lee
(74) *Attorney, Agent, or Firm* — Rabin & Berdo, P.C.

(57) ABSTRACT

A group communication method of a terminal is provided. The terminal establishes a group call connection with a first base station belonging to a group call zone, and receives group call data from the first base station. When moving to the coverage area of a second base station belonging to the group call zone, the terminal receives group call data from the second base station.

13 Claims, 8 Drawing Sheets

(56) References Cited

OTHER PUBLICATIONS

Eunkyung Kim et al., "Proposed Text on the E-MBS Operation in Idle State in IEEE P802.16m (16.9.2.3 and 16.2.8.2.10.2)", IEEE 802.16 Broadband Wireless Access Working Group, IEEE C802.16m-10/0915, Jul. 9, 2010.

Nan Li et al., "Text Clean up for E-MBS Connection Establishment in IEEE 802.16m (16.9.2.1)", IEEE 802.16 Broadband Wireless Access Working Group, IEEE C80216m-10_0599r1, May 11, 2010.

Giwon Park et al., Proposed Text for mobility information in AAI_RNG-REQ/AAI_DREG-REQ message (16.2.3), IEEE 802.16 Broadband Wireless Access Working Group, IEEE C802.16m-10/0796r1, Jul. 13, 2010.

* cited by examiner

GROUP COMMUNICATION METHOD AND APPARATUS

TECHNICAL FIELD

The present invention relates to a group communication method and apparatus.

BACKGROUND ART

Because a group communication service in which a plurality of users participate in a call simultaneously transmits the same downlink traffic to all users in a group, a downlink multicast-based or broadcast-based communication connection, as well as a unicast connection, can be used. Therefore, for a cellular based wireless access system using the group communication service, a conventional broadcast service technology, for example, a multicast broadcast service (MBS) technology or terminal-based unicast service technology, can be taken into consideration.

Application of a conventional idle mode scheme to a group communication terminal is inefficient because the conventional art is designed for a unicast service terminal or broadcast service terminal. Particularly, if there are a large number of users currently participating in group communication, and most of the users are participating in the service for the purpose of listening, uplink traffic may be limited to some specific users. Moreover, call duration of a group communication such as push-to-talk (PTT) may be substantially long, unlike a one-to-one voice service in a general public network, and a deactivation interval of voice traffic may continue for a considerably long period of time. Accordingly, if the users move and spread over many cells, unnecessary handover is performed to maintain a bidirectional connection establishment even if no group communication traffic occurs. Further, a base station maintains an unnecessary connection establishment and continuously manages information of each terminal, resulting in low efficiency and higher power consumption of a terminal.

DISCLOSURE

Technical Problem

Embodiments of the present invention provide a group communication method and apparatus for performing an idle mode operation that is suitable for group communication.

Technical Solution

An embodiment of the present invention provides a group communication method of a terminal. The method includes establishing a group call connection with a first base station belonging to a group call zone, receiving group call data from the first base station, moving to a coverage area of a second base station belonging to the group call zone, and receiving group call data from the second base station without re-registering with the second base station.

The method may further include assigning a group ID for a group call in the group call zone from the first base station. The terminal may also use the group ID at the second base station.

Receiving the group call data from the first base station may include entering an idle mode, and receiving the group call data from the first base station in the idle mode.

Entering the idle mode may include exchanging a deregistration request message and a deregistration response message on the deregistration request message with the first base station.

Moving to the coverage area of the second base station may include moving to the coverage area of the second base station in the idle mode.

Receiving the group call data from the second base station may include receiving the group call data from the second base station in an idle mode.

The method may further include entering an idle mode, moving to a third base station not belonging to the group call zone in the idle mode, receiving broadcast information from the third base station, and acquiring group call information on a group call zone to which the third base station belongs from the broadcast information.

The method may further include receiving broadcast information including group call information from the third base station, and recognizing moving across the group call zone based on the broadcast information.

Another embodiment of the present invention provides a group communication method of a terminal. The method includes establishing a group call connection with a first base station, receiving group call data from the first base station; entering an idle mode, and receiving group call data from the first base station in the idle mode.

Entering the idle mode may include exchanging a deregistration request message and a deregistration response message on the deregistration request message with the first base station.

The method may further include moving to a second base station belonging to the same group call zone as the first base station, and receiving group call data from the second base station without re-registering with the second base station.

The g method may further include moving to a second base station belonging to a different group call zone from that of the first base station, receiving broadcast information from the second base station, and acquiring group call information on a group call zone to which the second base station belongs from the broadcast information.

The method may further include, when a group call zone changes in the idle mode, performing a location update with the second base station of a changed group call zone.

Performing the location update may include receiving information regarding the changed group call zone from the second base station in unicast.

Yet another embodiment of the present invention provides a terminal including a controller and a receiver. The controller establishes a group call connection with a first base station belonging to a group call zone. The receiver receives group call data from the first base station, and upon moving to a coverage area of a second base station belonging to the group call zone, receives group call data from the second base station without re-registering with the second base station.

The controller may be assigned a group ID for a group call in the group call zone from the first base station, and may also use the group ID in the second base station.

The terminal may further include an idle mode controller configured to enter an idle mode. The receiver may receive group call data from the first base station in the idle mode.

Advantageous Effects

According to an embodiment of the present invention, even if the terminal moves to another base station, the terminal may continue to receive a group call service by the group call zone.

According to another embodiment of the present invention, even if the terminal being serviced with a group call enters the idle mode, the terminal may continue to receive a group call service.

MODE FOR INVENTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and it may include entire or partial functions of the MT, the MS, the AMS, the HR-MS, the SS, the PSS, the AT, and the UE.

In the specification, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, and a high reliability relay station (HR-RS) serving as a base station, and it may include entire or partial functions of the ABS, the HR-BS, the node B, the eNodeB, the AP, the RAS, the BTS, the MMR-BS, the RS, and the HR-RS.

FIG. 1 to FIG. 4 show a group communication system according to an embodiment of the present invention.

Figure 1:
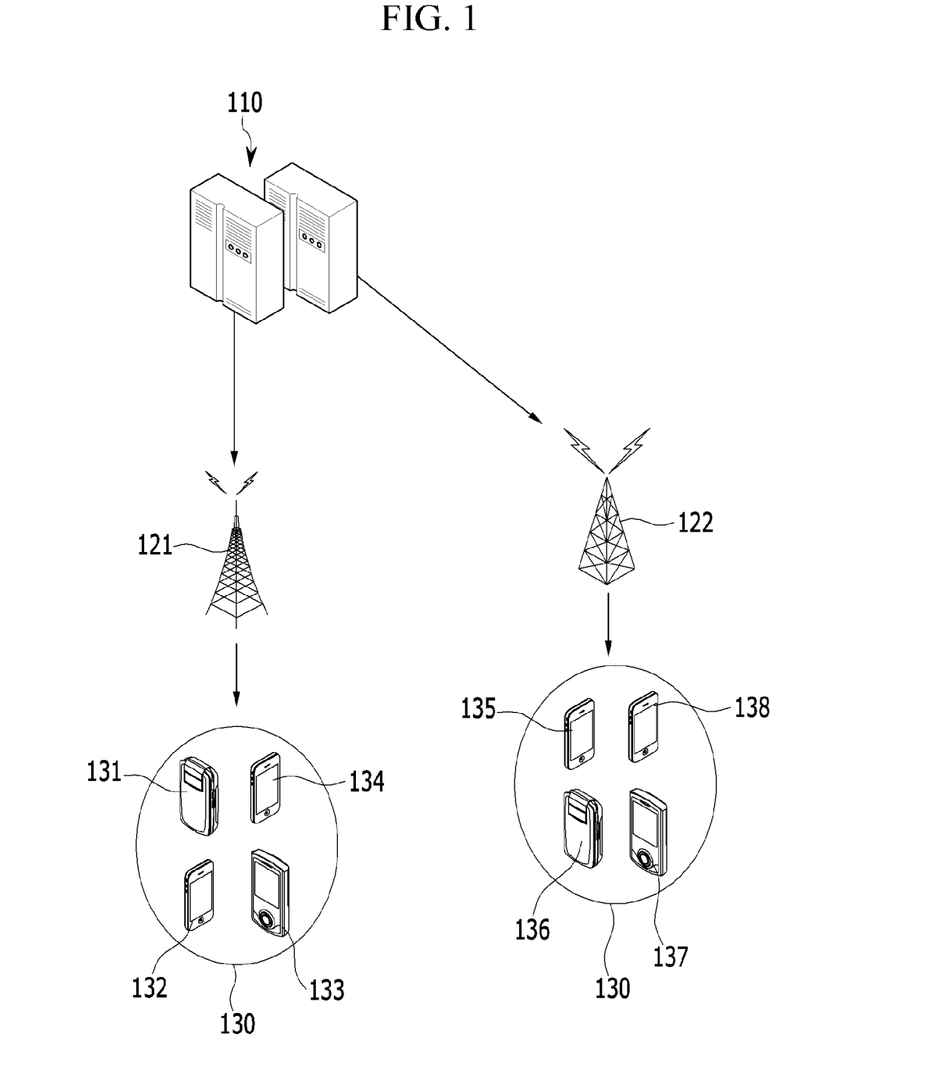
FIG. 1 to FIG. 4 show a group communication system according to an embodiment of the present invention.

Referring to FIG. 1, traffic is transmitted from a node 110 to at least one of base stations 121 and 122 for a group communication. The node may be a call server 110, for example, an upper node such as a PTT server. The PTT server 110 may be connected to the base stations 121 and 122 via a router (not shown) and a control station (not shown). The base stations 121 and 122 establishes a group call connection in a wireless access interval, and respectively transmit traffic to terminals 131 to 134 and 135 to 138, which belong to their coverage area, of a user group 130 in multicast.

Figure 2:
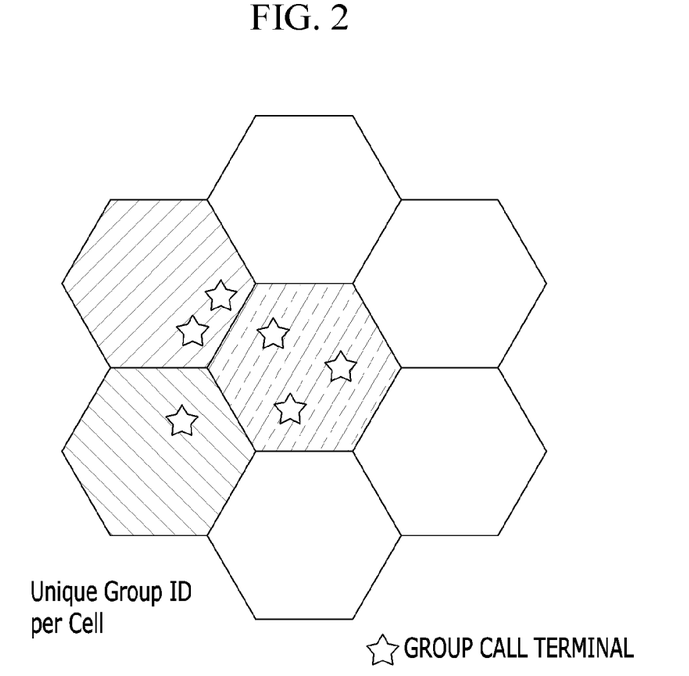
Figure 3:
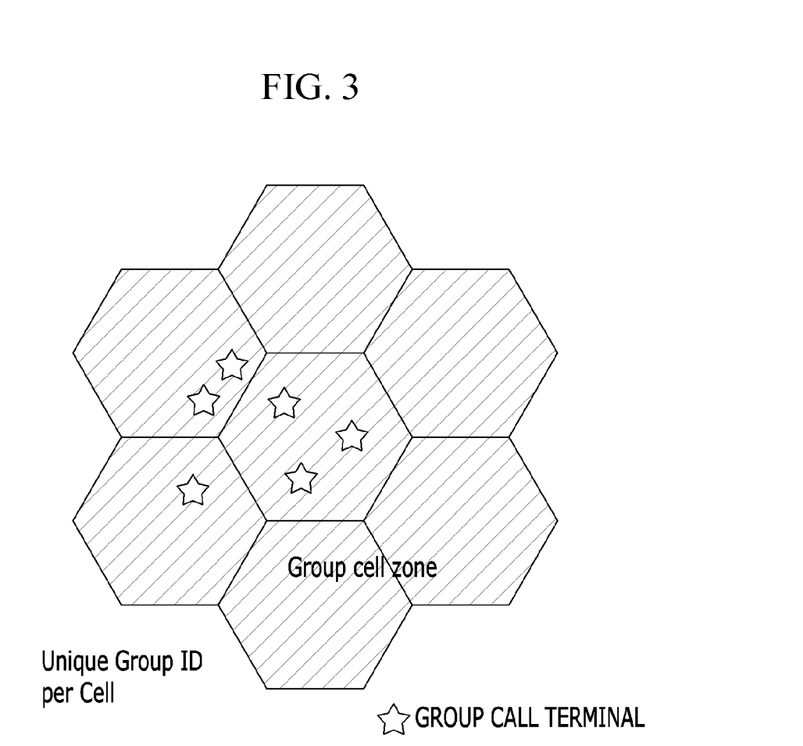
Figure 4:
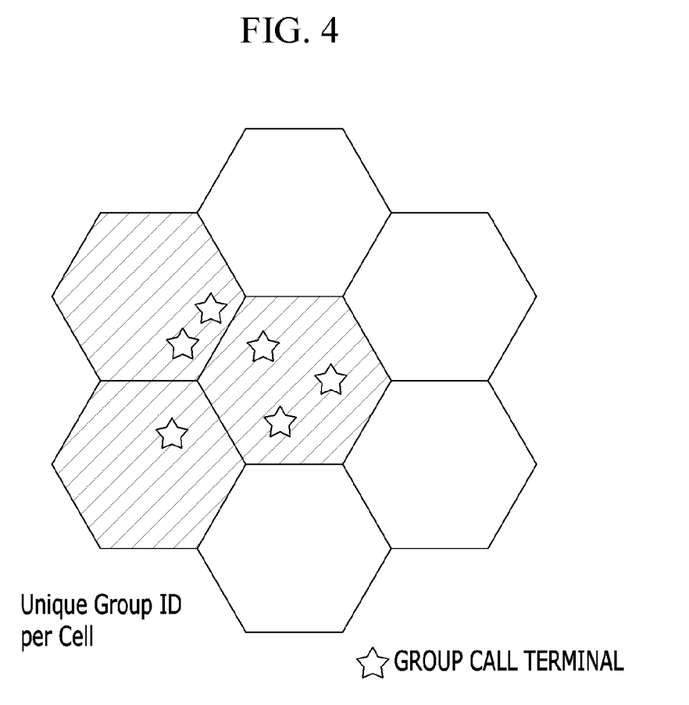

As shown in FIG. 2 to FIG. 4, the group communication system may be divided into three types according to an operation scheme of a base station.

The group communication system shown in FIG. 2 uses a single BS group call service. For a group call for group communication, each base station manages terminals belonging to their cell coverage area. Accordingly, even if a plurality of terminals belong to the same user group, each terminal is assigned a group identifier (ID) depending on a cell to which it belongs. That is, the group ID for identifying the group call is unique only for the corresponding base station. Group call connectivity of a terminal is available only for a serving base station. Upon handover of the terminal, a target base station establishes a connection for the group call, and the terminal is assigned a group ID.

The group communication system shown in FIG. 3 uses a macro BS group call service. A group call zone is defined over a plurality of base stations, and a connection establishment for a group call is managed within the group call zone. Accordingly, a group ID for identifying the group call is unique in the same group call zone. That is, the unique group ID is assigned for each group call zone. In the macro BS group call service, a group call service is provided in a corresponding cell regardless of the presence or absence of a group call terminal in an active state within a corresponding base station.

The group call zone may be dynamically defined, focusing on an area where a group communication takes place, and may be identified by a group call zone ID. Information about the group call zone may be determined in a group call establishment procedure, or determined in advance in a procedure of configuring a user group for a group call. Furthermore, the same group call establishment may be performed in different group call zones. Group call connection establishment information and resource allocation for a group call may differ according to different group call zones.

The group communication system shown in FIG. 4 uses an MS-positioned group call service. Although the group communication system of FIG. 4 is similar to the group communication system shown in FIG. 3 in that a plurality of base stations share a group call connection establishment, they are different in that a group call zone consists only of base stations in a cell coverage area where terminals in the user group are in the active state to thus provide the group call service. Accordingly, the unique group ID is assigned for each service.

The group communication system described in FIG. 3 and FIG. 4 may further include a controller for managing a group call zone and a group ID. The controller may be mounted in a group call server (110 of FIG. 1), or may be constructed as a separate server.

Next, a group communication method for a terminal in a group communication system in which a group call zone is defined will be described with reference to FIG. 5 to FIG. 7.

Figure 5:
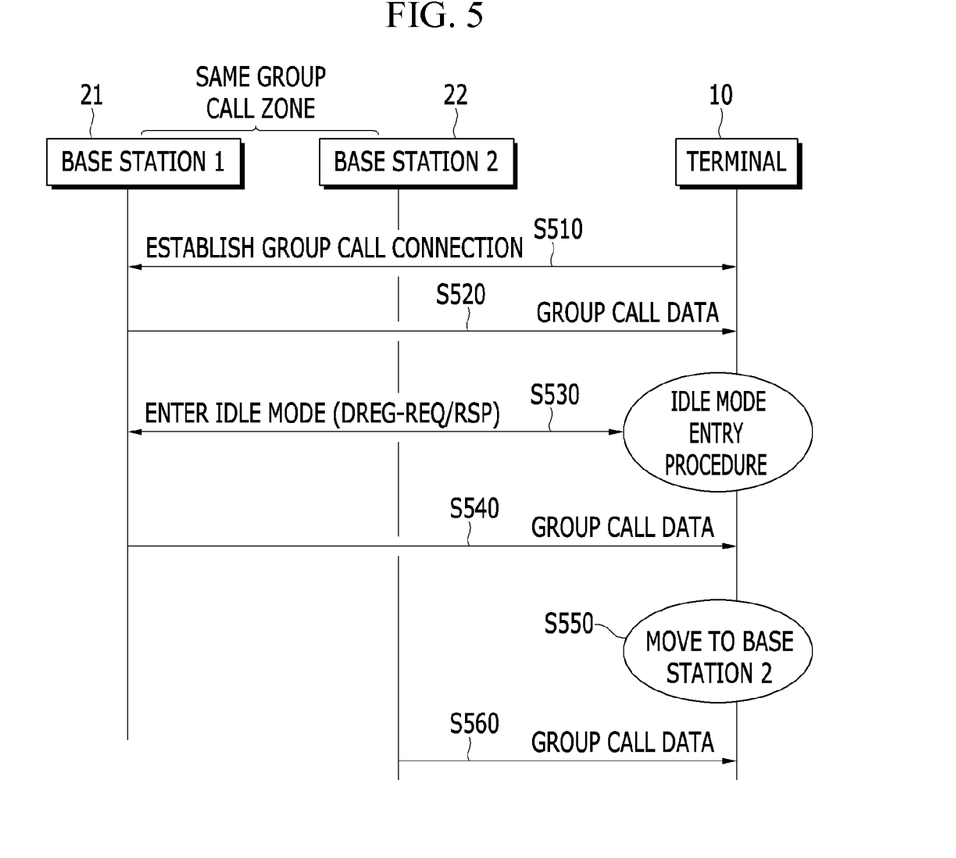
FIG. 5 to FIG. 7 show a group communication method in a group communication system according to an embodiment of the present invention.
Figure 6:
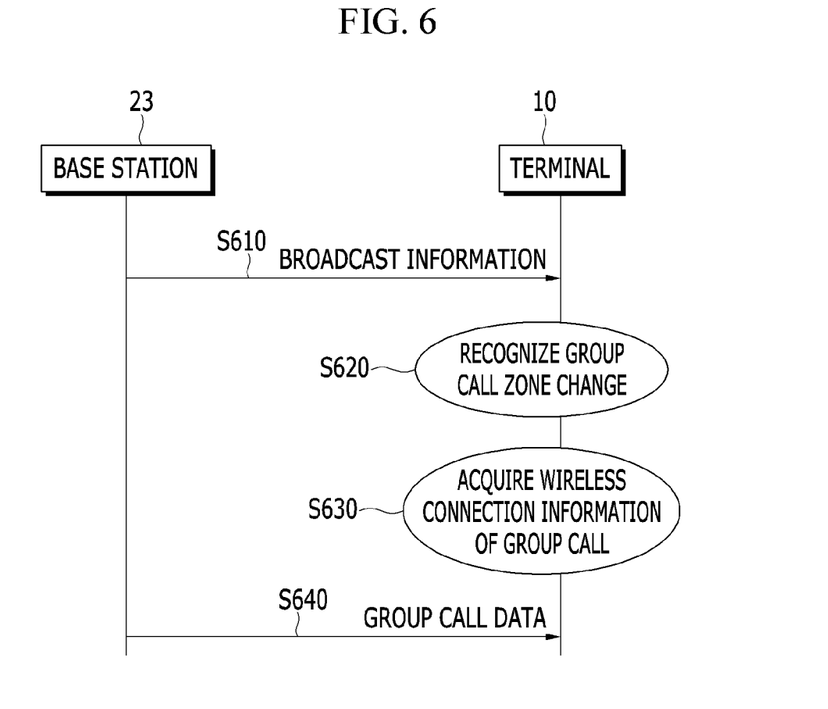
Figure 7:
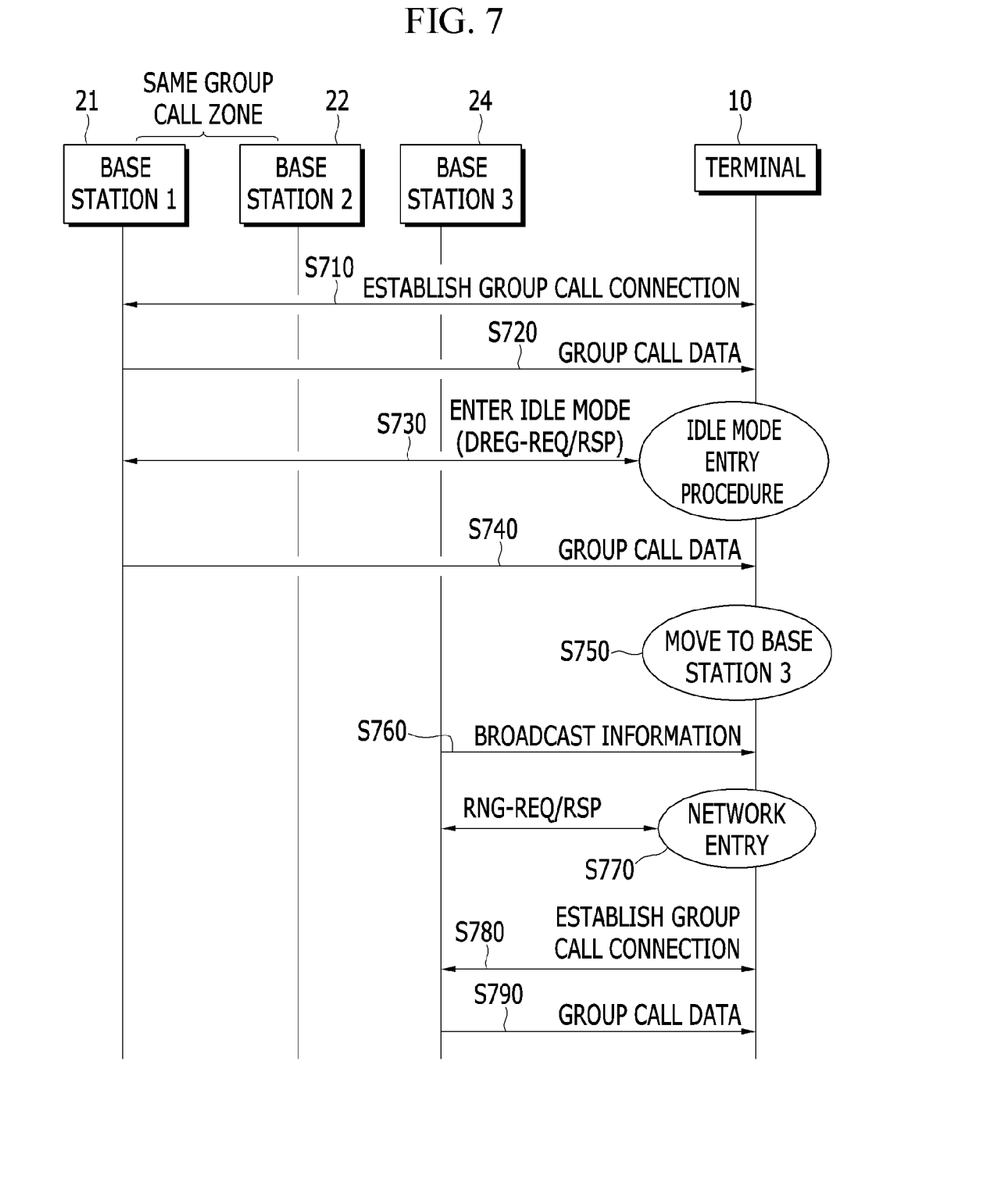

FIG. 5 to FIG. 7 show a group communication method in a group communication system according to an embodiment of the present invention.

Referring to FIG. 5, a terminal 10 belonging to a user group for group communication establishes a group call connection, i.e., a multicast connection, with a serving base station 21 (S510). The terminal 10 continuously receives group call data through the serving base station (S520). The base station 21 transmits the group call data to the terminals of the user group belonging to its coverage area in multicast.

The terminal may enter the idle mode while receiving the group call data (S530). For example, if there is no data to be sent for a predetermined time, or no connection establishment other than the group call connection establishment exists, the terminal 10 may enter the idle mode. To enter the idle mode, the terminal 10 and the serving base station 21 may exchange a deregistration request (DREG-REQ) message for a unicast connection establishment and a deregistration response (DREG-RSP) message on the DREG-REQ message. In the idle mode, the terminal 10 periodically repeats a paging listening interval and a paging unavailable interval. Moreover, the terminal 10 can receive the group call data within the group call zone via the multicast connection for the group call even in the idle mode (S540).

Next, if the terminal 10 moves from the base station 21 to another base station 22 belonging to the same group call zone as the base station 21 (S550), the terminal 10 continuously receives group call data through the base station 22 without changing group call connection establishment information because the two base stations 21 and 22 belong to the same group call zone (S560). That is, the terminal 10 can continuously receive the group call data without re-registering to the base station 22.

Meanwhile, as shown in FIG. 5, the group call zone to which the terminal 10 belongs may be changed while the terminal 10 is receiving a group call service. As shown in FIG. 6, the terminal 10 receives broadcast information of a base station 23 belonging to a changed group call zone (S610), and recognizes the group call zone change based on the received broadcast information (S620). The broadcast information may include group call information, and the group call information may include a group call zone ID and a group ID. The terminal 10 recognizes the group call zone change, and acquires wireless connection information of the same group call as the group ID corresponding to a group call desired to be serviced (S630). Accordingly, the terminal 10 continues to receive group call data from the base station 23 (S640). In the case of the group call zone change, the terminal 10 may perform a location update for the corresponding group call zone. The terminal 10 and the base station 23 may exchange group call information of the changed group call zone in unicast during the location update procedure.

Next, referring to FIG. 7, after establishing a group call connection to the base station 21 to receive a group call service and entering the idle mode (S710, S720, S730, and S740), as described in FIG. 5, the terminal 10 may move from the group call zone of the base station 21 to another base station 24 (S750). The terminal 10 periodically receives broadcast information from the base station 24 (S760). The broadcast information may include group call information, and the group call information may include a group call zone ID and a group ID. The terminal 10 acquires the group call information of the group call zone to which the base station 24 belongs from the broadcast information, finishes the idle mode if the broadcast information does not include any information about the received group call, and performs a network entry procedure via the base station 24 (S770). The terminal 10 may perform the network entry procedure by exchanging a ranging request (RNG-REQ) message and a ranging response (RNG-RSP) message with the base station 230. Next, the terminal 10 performs a group call connection establishment with the base station 24 (S780), and receives a group call service again (S790). The base station 24 may be included in a group call zone and operated by exchanging information with a controller that manages the group call zone, or may maintain its own group call connection establishment.

As described above, according to an embodiment of the present invention, a terminal can continue to receive a group call service by the group call zone even if the terminal moves to another base station, and the terminal being serviced with the group call can also continue to receive the group call service even if it enters the idle mode.

Meanwhile, if there is no group call data for a predetermined time after the terminal enters the idle mode, the group call connection may be deregistered. In this case, when group call data is generated, the base station may page the terminals belonging to the user group with a multicast paging message. To page the user group, the base station may use a multicast deregistration ID (DID) or group ID that is pre-assigned to the user group. By using a multicast paging message, it is possible to prevent overload of paging signaling that may occur when individually paging the terminals in the user group.

Furthermore, network entry priorities may differ according to the class of the terminals in order to control excessive delay and collision caused by the ranging procedure when terminals of the user group enter a network by the paging. Alternatively, a terminal group that does not require confirmation of the presence of a terminal when establishing a group call may initiate a group communication service in the listening mode without a network entry procedure. Such a terminal may attempt network entry at a point of time when an uplink connection establishment is required or network entry overload is eliminated.

Next, a group communication apparatus for performing a group communication method according to an embodiment of the present invention will be described with reference to FIG. 8.

Figure 8:
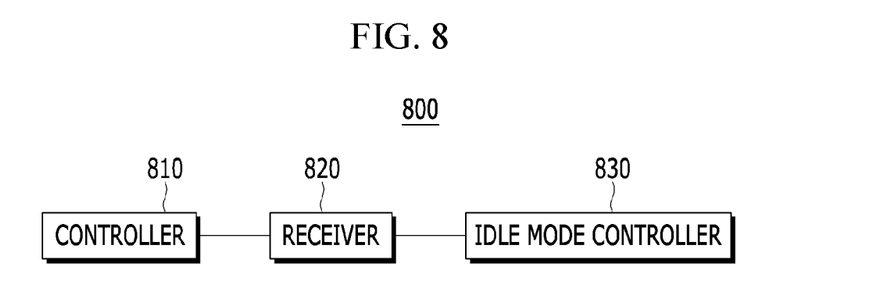
FIG. 8 is a block diagram of a group communication apparatus according to an embodiment of the present invention.

FIG. 8 is a block diagram of a group communication apparatus according to an embodiment of the present invention.

Referring to FIG. 8, a group communication apparatus 800 may include a controller 810, a receiver 820, and an idle mode controller 830. The group communication apparatus 800 may be formed in the terminal 10, or may be the terminal 10 itself.

As described with reference to FIG. 5 to FIG. 7, the receiver 820 receives group call data and broadcast information transmitted from a base station.

As described with reference to FIG. 5 to FIG. 7, the controller 810 establishes a group call connection with the base station, and, upon movement, checks based on broadcast information whether the current base station belongs to the current group call zone or not. In addition, the controller 810 is assigned a group ID from the base station, and uses the same group ID in the same group call zone.

As described with reference to FIG. 5 to FIG. 7, the idle mode controller 830 controls the operation of the terminal 10 in the idle mode.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A group communication method of a terminal, the method comprising:
   establishing a group call connection with a first base station belonging to a group call zone;
   receiving group call data from the first base station;
   moving to a coverage area of a second base station belonging to the group call zone; and
   receiving group call data from the second base station without re-registering with the second base station;
   wherein receiving the group call data from the first base station comprises:
   entering an idle mode by exchanging a deregistration request message and a deregistration response message on the deregistration request message with the first base station; and
   receiving the group call data from the first base station in the idle mode.

2. The method of claim 1, further comprising assigning a group ID for a group call in the group call zone from the first base station,
   wherein the terminal also uses the group ID at the second base station.

3. The method of claim 1, wherein moving to the coverage area of the second base station comprises moving to the coverage area of the second base station in an idle mode.

4. The method of claim 3, wherein receiving the group call data from the second base station comprises receiving the group call data from the second base station in the idle mode.

5. The method of claim 1, further comprising:
   entering an idle mode;
   moving to a third base station not belonging to the group call zone in the idle mode;
   receiving broadcast information from the third base station; and
   acquiring group call information on a group call zone to which the third base station belongs, from the broadcast information.

6. The method of claim 1, further comprising:
   receiving broadcast information including group call information from a third base station; and
   recognizing moving across the group call zone based on the broadcast information.

7. A group communication method of a terminal, the method comprising:
   establishing a group call connection with a first base station;
   receiving group call data from the first base station;
   entering an idle mode; and
   receiving group call data from the first base station in the idle mode;
   wherein entering the idle mode comprises exchanging a deregistration request message and a deregistration response message on the deregistration request message with the first base station.

8. The method of claim 7, further comprising:
   moving to a second base station belonging to the same group call zone as the first base station; and
   receiving group call data from the second base station without re-registering with the second base station.

9. The method of claim 7, further comprising:
   moving to a second base station belonging to a different group call zone from that of the first base station;
   receiving broadcast information from the second base station; and
   acquiring group call information on a group call zone to which the second base station belongs, from the broadcast information.

10. The method of claim 7, further comprising, when a group call zone changes in the idle mode, performing a location update with the second base station of a changed group call zone.

11. The method of claim 10, wherein performing the location update comprises receiving information regarding the changed group call zone from the second base station in unicast.

12. A group communication apparatus, the apparatus comprising:
    a controller configured to establish a group call connection with a first base station belonging to a group call zone;
    a receiver configured to receive group call data from the first base station, and upon moving to a coverage area of a second base station belonging to the group call zone, receive group call data from the second base station without re-registering with the second base station; and
    an idle mode controller configured to enter an idle mode by exchanging a deregistration request message and a deregistration response message on the deregistration request message with the first base station,
    wherein the receiver receives group call data from the first base station in the idle mode.

13. The apparatus of claim 12, wherein the controller is assigned a group ID for a group call in the group call zone from the first base station, and also uses the group ID in the second base station.

* * * * *